United States Patent [19]

Zinsmeyer

[11] Patent Number: 4,589,060

[45] Date of Patent: May 13, 1986

[54] MICROCOMPUTER SYSTEM FOR CONTROLLING THE CAPACITY OF A REFRIGERATION SYSTEM

[75] Inventor: Thomas M. Zinsmeyer, Pennellville, N.Y.

[73] Assignee: Carrier Corporation, Syracuse, N.Y.

[21] Appl. No.: 610,062

[22] Filed: May 14, 1984

[51] Int. Cl.$^4$ .................. G06F 15/46; F25D 17/02
[52] U.S. Cl. .................................. 364/148; 62/201; 62/217; 364/177; 364/505; 364/557
[58] Field of Search ............... 364/148, 152, 176, 177, 364/557, 550, 551, 505; 62/98, 99, 157, 185, 201, 215, 217, 226, 227, 228.5; 165/12; 318/599, 624; 236/1 E, 46 R, 46 F, 76, 78 D

[56] References Cited

U.S. PATENT DOCUMENTS

| | | | |
|---|---|---|---|
| 3,081,604 | 3/1963 | Namisniak et al. | 62/84 |
| 3,204,423 | 9/1965 | Resh, Jr. | 62/215 |
| 3,493,167 | 2/1970 | Akerhielm et al. | 230/4 |
| 3,625,628 | 12/1971 | Byrns | 415/150 |
| 3,703,183 | 11/1972 | Worthen | 137/47 |
| 3,780,532 | 12/1973 | Norbeck et al. | 62/226 X |
| 4,068,980 | 1/1978 | Fine et al. | 417/282 |
| 4,081,691 | 3/1978 | Evalds et al. | 236/1 EA X |
| 4,201,061 | 5/1980 | Heffernan | 62/98 |
| 4,270,362 | 6/1981 | Lancia et al. | 62/203 X |
| 4,330,999 | 5/1982 | Nakayama | 62/217 |
| 4,407,139 | 10/1983 | Ide et al. | 62/215 |
| 4,505,125 | 3/1985 | Baglione | 62/228.3 X |

Primary Examiner—Joseph Ruggiero
Attorney, Agent, or Firm—Douglas L. Miller

[57] ABSTRACT

A microcomputer system and method for controlling the capacity of a refrigeration system are disclosed. The microcomputer system receives electrical input signals indicative of operator selected settings and refrigeration system operating parameters. The microcomputer system processes these input signals to generate a control signal which is a step function of the temperature difference between a desired set point temperature and the sensed temperature of a heat transfer fluid cooled by operation of the refrigeration system. The width of each step of the step function is directly proportional to a selected capacity control response factor. By selecting different capacity control response factors, capacity control of the refrigeration system is tailored to meet specific job requirements of a particular job application for the refrigeration system.

8 Claims, 2 Drawing Figures

MICROCOMPUTER SYSTEM FOR CONTROLLING THE CAPACITY OF A REFRIGERATION SYSTEM

BACKGROUND OF THE INVENTION

The present invention relates to methods of operating and control systems for refrigeration systems and, more particularly, to methods of operating and control systems for capacity control devices, such as compressor inlet guide vanes, in centrifugal vapor compression refrigeration systems.

Generally, refrigeration systems include an evaporator or cooler, a compressor, and a condenser. Usually, a heat transfer fluid is circulated through tubing in the evaporator thereby forming a heat transfer coil in the evaporator to transfer heat from the heat transfer fluid flowing through the tubing to refrigerant in the evaporator. The heat transfer fluid chilled in the tubing in the evaporator is normally water which is circulated to a remote location to satisfy a refrigeration load. The refrigerant in the evaporator evaporates as it absorbs heat from the water flowing through the tubing in the evaporator, and the compressor operates to extract this refrigerant vapor from the evaporator, to compress this refrigerant vapor, and to discharge the compressed vapor to the condenser. In the condenser, the refrigerant vapor is condensed and delivered back to the evaporator where the refrigeration cycle begins again.

To maximize operating efficiency, it is desirable to match the amount of work done by the compressor to the work needed to satisfy the refrigeration load placed on the refrigeration system. Commonly, this is done by capacity control means which adjust the amount of refrigerant vapor flowing through the compressor. The capacity control means may be a device such as guide vanes which are positioned between the compressor and the evaporator and which move between a fully open and a fully closed position in response to the temperature of the chilled water leaving the chilled water coil in the evaporator. When the evaporator chilled water temperature falls, indicating a reduction in refrigeration load on the refrigeration system, the guide vanes move toward their closed position, decreasing the amount of refrigerant vapor flowing through the compressor. This decreases the amount of work that must be done by the compressor thereby decreasing the amount of energy needed to operate the refrigeration system. At the same time, this has the effect of increasing the temperature of the chilled water leaving the evaporator. In contrast, when the temperature of the leaving chilled water rises, indicating an increase in load on the refrigeration system, the guide vanes move toward their fully open position. This increases the amount of vapor flowing through the compressor and the compressor does more work thereby decreasing the temperature of the chilled water leaving the evaporator and allowing the refrigeration system to respond to the increased refrigeration load. In this manner, the compressor operates to maintain the temperature of the chilled water leaving the evaporator at, or within a certain range of, a set point temperature.

Many different capacity control systems are known for controlling a refrigeration system in the manner described above. For example, one such control system, a model CP-8142-024 Electronic Chiller Controller available from the Barber-Colman Company having a place of business in Rockford, Ill. adjusts a capacity control device in a refrigeration system as a function of the deviation of evaporator chilled water temperature from a desired set point temperature. When the evaporator chilled water temperature deviates from the selected set point temperature by a predetermined amount the capacity control device is continuously adjusted by an actuator which is continuously energized by a stream of electrical pulses supplied to the actuator. The predetermined amount of temperature deviation before the actuator is continuously energized provides a temperature deadband in which the capacity control device is not adjusted. The pulse rate of the stream of electrical pulses supplied to the actuator determines the overall rate of adjustment of the capacity control device. This pulse rate may be set at either a minimum, middle, or maximum value thereby providing a limited capability for tailoring operation of the control system to meet specific job requirements of a particular job application for the refrigeration system. However, apparently due to the operation of, and interrelationships among, the electrical components of the control system, the extent of the deadband depends on which pulse rate setting is selected. Also, the pulse rate is an analog function of the deviation of evaporator leaving chilled water temperature from the desired set point temperature thereby rendering this control system not particularly suitable for use with a microcomputer system for controlling overall operation, including capacity, of a refrigeration system.

SUMMARY OF THE INVENTION

Therefore, it is an object of the present invention to provide a simple, efficient, and effective microcomputer system for controlling the capacity of a refrigeration system.

It is another object of the present invention to provide an easily programmable microcomputer system for controlling the capacity of a refrigeration system to meet specific job requirements of a particular job application for the refrigeration system.

These and other objects of the present invention are attained by a capacity control system for a refrigeration system comprising a capacity control device for controlling refrigerant flow in the refrigeration system, a microcomputer, and means for generating first, second, third, and fourth signals indicative of a selected capacity control device response factor (proportional band setting), a selected set point temperature for a heat transfer fluid cooled by operation of the refrigeration system, a sensed temperature of the heat transfer fluid cooled by operation of the refrigeration system, and a selected upper limit of a temperature deadband relative to the selected set point temperature, respectively. The first, second, third, and fourth signals are supplied to the microcomputer which determines the relative temperature difference between the sensed temperature of the heat transfer fluid cooled by operation of the refrigeration system and the selected set point temperature. When the sensed temperature of the heat transfer fluid is determined to be greater than the selected set point temperature by an amount which exceeds the upper limit of the selected temperature deadband, the microcomputer generates a control signal which is a step function of the determined temperature difference. The width of each step of the step function is directly proportional to the selected capacity control device response factor. The step function is easily programmed into the microcomputer since the step function is a digital type function which is highly compatible with microcomputer programming techniques. The capacity control device is adjusted to control refrigerant flow in the refrigeration system in response to the control signal generated by the microcomputer. By selecting different capacity control device response factors, operation of the capacity control device may be easily, efficiently, and effectively tailored to meet specific job requirements of a particular job application for the refrigeration system.

BRIEF DESCRIPTION OF THE DRAWING

Still other objects and advantages of the present invention will be apparent from the following detailed description of the present invention in conjunction with the accompanying drawing in which.

DESCRIPTION OF THE PREFERRED EMBODIMENT

Figure 1:
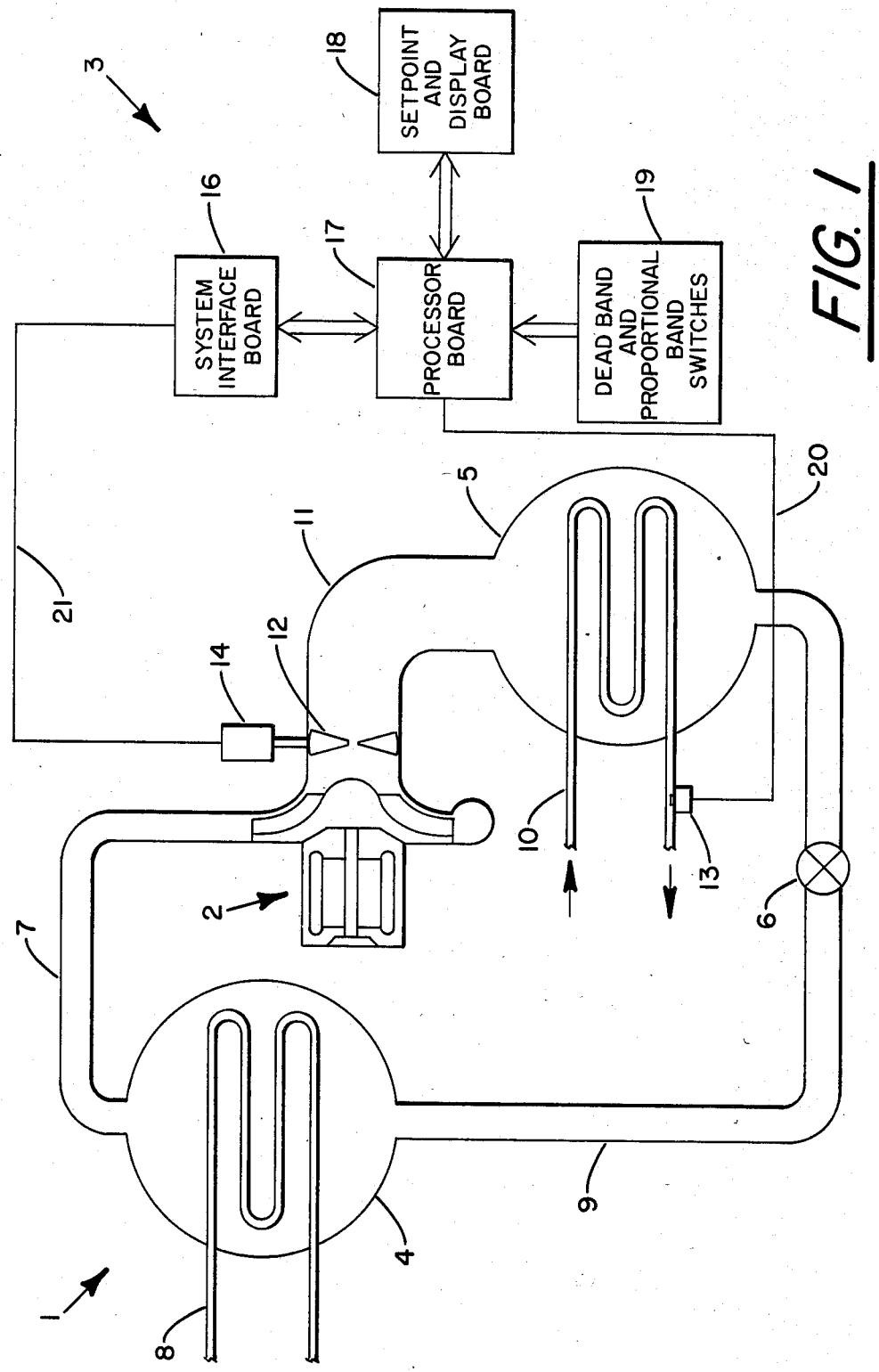
FIG. 1 is a schematic illustration of a centrifugal vapor compression refrigeration system with a control system for varying the capacity of the refrigeration system according to the principles of the present invention.

Referring to FIG. 1, a vapor compression refrigeration system 1 is shown having a centrifugal compressor 2 with a control system 3 for varying the capacity of the refrigeration system 1 according to the principles of the present invention. As shown in FIG. 1, the refrigeration system 1 includes a condenser 4, an evaporator 5 and an expansion valve 6. In operation, compressed gaseous refrigerant is discharged from the compressor 2 through compressor discharge line 7 to the condenser 4 wherein the gaseous refrigerant is condensed by relatively cool condensing water flowing through tubing 8 in the condenser 4. The condensed liquid refrigerant from the condenser 4 passes through the expansion valve 6 in refrigerant line 9 to evaporator 5. The liquid refrigerant in the evaporator 5 is evaporated to cool a heat transfer fluid, such as water, flowing through tubing 10 in the evaporator 5. This cool heat transfer fluid is used to cool a building or is used for other such purposes. The gaseous refrigerant from the evaporator 5 flows through compressor suction line 11 back to compressor 2 under the control of compressor inlet guide vanes 12. The gaseous refrigerant entering the compressor 2 through the guide vanes 12 is compressed by the compressor 2 and discharged from the compressor 2 through the compressor discharge line 7 to complete the refrigeration cycle. This refrigeration cycle is continuously repeated during normal operation of the refrigeration system 1.

The compressor inlet guide vanes 12 are opened and closed by a guide vane actuator 14 controlled by the capacity control system 3 which comprises a system interface board 16, a processor board 17, a set point and display board 18, and deadband and proportional band switches 19. Also, a temperature sensor 13 for sensing the temperature of the heat transfer fluid leaving the evaporator 5 through the tubing 10, is connected by electrical lines 20 directly to the processor board 17.

Preferably, the temperature sensor 13 is a temperature responsive resistance device such as a thermistor having its sensing portion located in the heat transfer fluid leaving the evaporator 5 with its resistance monitored by the processor board 17, as shown in FIG. 1. Of course, as will be readily apparent to one of ordinary skill in the art to which the present invention pertains, the temperature sensor 13 may be any of a variety of temperature sensors suitable for generating a signal indicative of the temperature of the heat transfer fluid leaving the evaporator 5 and for supplying this generated signal to the processor board 17.

The processor board 17 may be any device, or combination of devices, capable of receiving a plurality of input signals, processing the received input signals according to preprogrammed procedures, and producing desired output control signals in response to the received and processed input signals, in a manner according to the principles of the present invention. For example, the processor board 17 may comprise a microcomputer, such as a model 8031 microcomputer available from Intel Corporation which has a place of business at Santa Clara, Calif.

Also, preferably, each of the deadband and proportional band switches 19 is a "DIP" (Dual Inline Package) switch, such as a model 5-435166-3 DIP switch available from Amp, Inc. which has a place of business at Harrisburg, Pa., which is suitable for use with the processor board 17. However, each of these switches 19 may be any device capable of generating a suitable signal which is indicative of a selected setting and which is compatible with the processor board 17. Also, it should be noted that, although the switches 19 are shown as separate components in FIG. 1, these switches 19 may be physically part of the processor board 17 in an actual capacity control system 3.

Further, preferably, the set point and display board 18 comprises a visual display, including, for example, light emitting diodes (LED's) or liquid crystal display (LCD's) devices forming a multi-digit display which is under the control of the processor board 17. Also, the set point and display board 18 includes a device, such as a set point potentiometer model AW5403 available from CTS, Inc. which has a place of business at Skyland, N.C., which is adjustable to output a signal to the processor board 17 indicative of a selected set point temperature for the chilled water leaving the evaporator 5 through the evaporator chilled water tubing 10.

Still further, preferably, the system interface board 16 includes at least one switching device, such as a model SC-140 triac available from General Electric, Corp. which has a place of business at Auburn, N.Y., which is used as a switching element for controlling a supply of electrical power (not shown) through electrical lines 21 to the guide vane actuator 14. The triac switches on the system interface board 16 are controlled in response to control signals received by the triac switches from the processor board 17. In this manner, electrical power is supplied through the electrical lines 21 to the guide vane actuator 14 under control of the processor board 17 to operate the guide vane actuator 14 in the manner according to the principles of the present invention which is described in detail below. Of course, as will be readily apparent to one of ordinary skill in the art to which the present invention pertains, switching devices other than triac switches may be used in controlling power flow from the power supply (not shown) through the electrical lines 21 to the guide vane actuator 14 in response to output control signals from the processor board 17.

The guide vane actuator 14 may be any device suitable for driving the guide vanes 12 toward either their open or closed position in response to electrical power signals received via electrical lines 21. For example, the guide vane actuator 14 may be an electric motor, such as a model MC-351 motor available from the Barber-Colman Company having a place of business in Rockford, Ill., for driving the guide vanes 12 toward either their open or closed position depending on which one of two triac switches on the system interface board 16 is actuated in response to control signals received by the triac switches from the processor board 17. The guide vane actuator 14 drives the guide vanes 12 toward either their fully open or fully closed position at a constant, fixed rate only during that portion of a selected base time interval during which the appropriate triac switch on the system interface board 16 is actuated. The effective overall rate of opening or closing of the guide vanes 12 is determined by the processor board repeatedly actuating and then deactuating the appropriate triac switch to provide a series of electrical pulses with a desired duty cycle to the guide vane actuator 14. For example, if a 35 second base time interval is selected, and it is desired to open the guide vanes 12 at an effective overall rate of 50% of the fixed, constant operating speed of the guide vanes 12, then the appropriate triac switch is repeatedly actuated and then deactuated to energize the guide vane actuator 14 for only 17.5 seconds of the 35 second base time interval. If it is desired to open the guide vanes 12 at an effective overall rate of 25% of the fixed, constant operating speed of the guide vanes 12 then the appropriate triac switch is repeatedly actuated and then deactuated to energize the guide vane actuator 14 for only 8.75 seconds of the 35 second base time interval. In a particular capacity control system 3, the base time interval is selected for compatibility with the operating capabilities of the guide vanes 12 and the guide vane actuator 14, and for providing a desired capacity control system 3 response characteristic to changes in operating conditions of the vapor compression refrigeration system 1.

Referring to FIG. 1, in operation, the processor board 17 of the capacity control system 3 receives electrical input signals from the temperature sensor 13, from the deadband and proportional band switches 19, and from the set point and display board 18. The electrical signal from the temperature sensor 13 indicates the temperature of the heat transfer fluid in tubing 10 leaving the evaporator 5. The electrical signal from the set point and display board 18 indicates an operator selected, desired leaving heat transfer fluid temperature for the evaporator 5. The electrical signals from the deadband and proportional band switches 19 are operator selected settings for a desired deadband and a desired proportional band for the capacity control system 3. The deadband is a range of temperature about the selected evaporator leaving heat transfer fluid temperature in which it is desired not to actuate the capacity control system 3. The proportional band is a range of temperature above the selected evaporator leaving heat transfer fluid temperature in which it is desired to actuate the capacity control system 3 to vary the effective, overall rate of opening of the guide vanes 12 in the range of zero to 100% of the fixed, constant operating speed of the guide vanes 12. Essentially, the proportional band setting is an operator selectable guide vane 14 response factor which is used to tailor operation of the capacity control system 3 to specific job requirements of a particular job application for the refrigeration system 1.

According to the present invention, the processor board 17 processes its electrical input signals according to preprogrammed procedures to determine if the sensed temperature of the heat transfer fluid leaving the evaporator 5 is greater than the selected set point temperature by an amount which exceeds the upper limit of the selected temperature deadband. If the sensed temperature of the heat transfer fluid leaving the evaporator exceeds the upper limit of the selected temperature deadband, the processor board 17 generates control signals, for controlling the guide vane actuator 14, which are supplied from the processor board 17 to the triac switches on the system interface board 16. The control signals generated by the processor board 17 are a function of the selected guide vane response factor (proportional band setting) and the difference between the sensed temperature of the heat transfer fluid leaving the evaporator 5 and the selected set point temperature. The output control signals from the processor board 17 control the triac switches on the system interface board 16 to supply electrical power, as described previously, from the power supply (not shown) through the electrical lines 21 to the guide vane actuator 14. In this manner, the guide vane actuator 14 is energized to open the guide vanes 12 at an effective overall rate which is a function, preferably a step function, of the difference between the sensed temperature of the heat transfer fluid leaving the evaporator 5 and the desired set point temperature.

Figure 2:
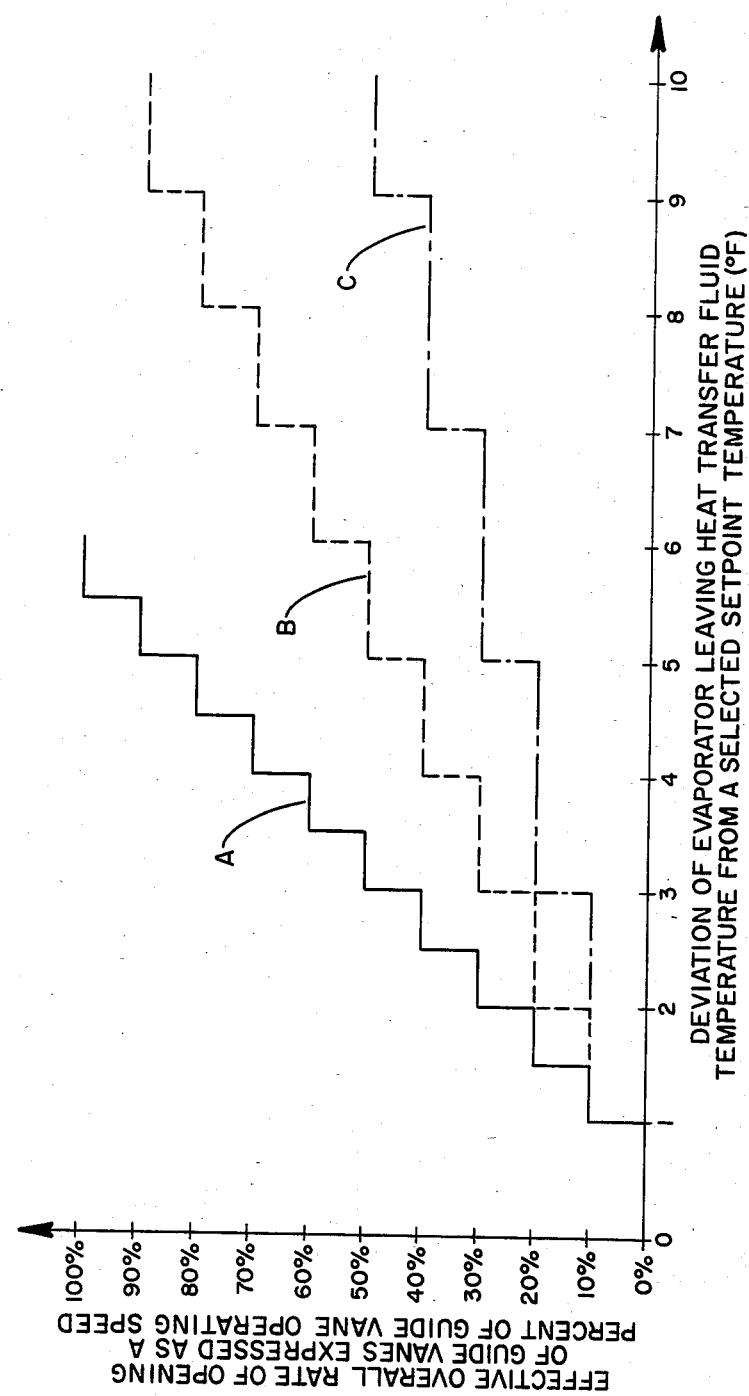
FIG. 2 is a graph illustrating the principles of operation of the control system shown in FIG. 1.

Referring to FIG. 2, purely illustrative examples are shown of the capacity control system 3 controlling the operation of the guide vanes 12 in the refrigeration system 1 in a stepwise manner according to the principles of the present invention. In FIG. 2, each of the curves labeled "A, B, or C" represents a hypothetical operating response curve for the guide vanes 12 in the refrigeration system 1 as a function of the deviation, in degrees Fahrenheit, of evaporator 5 leaving heat transfer fluid temperature from a selected set point temperature. An upper limit of plus one degree Fahrenheit is shown for the selected temperature deadband about the set point temperature for each curve A, B, and C. The vertical axis of FIG. 2 is the effective overall rate of opening of the guide vanes 12 expressed as a percent of the constant, fixed guide vane operating speed. That is, the vertical axis of FIG. 2 shows the effective percent duty cycle of operation of the guide vane actuator 14 (and thus the guide vanes 12) as determined by the repeated actuation and then de-actuation of the appropriate triac switch on the system interface board 16 which is controlled by the processor board 17 as described previously.

In FIG. 2, the curve labeled B illustrates an arbitrary base line step function with an arbitrary guide vane response factor selected by setting the deadband and proportional band switches 19 as described previously. Curve B illustrates that, after the plus one degree Fahrenheit upper limit of the temperature deadband is exceeded, the guide vanes 12 are driven open at an effective overall rate which is increased in a stepwise manner by 10% for each one degree Fahrenheit increase in the deviation of evaporator 5 leaving heat transfer fluid temperature from the selected set point temperature. The curve labeled A illustrates an operating response curve for the guide vanes 12 having a selected guide vane response factor which is one-half of the guide vane response factor for the base line curve B. That is, after the plus one degree Fahrenheit upper limit of the temperature deadband is exceeded, each one-half degree Fahrenheit temperature increase in the deviation of the evaporator 5 leaving heat transfer fluid temperature from the selected set point temperature results in a 10% increase in the effective overall rate of opening of the guide vanes 12. The curve labeled C illustrates an operating response curve for the guide vanes 12 having a selected guide vane response factor of two times the guide vane response factor for the base line curve B. That is, after the plus one degree Fahrenheit upper limit of the temperature deadband is exceeded, each two degree Fahrenheit temperature increase in the deviation of the evaporator 5 leaving heat transfer fluid temperature from the selected set point temperature results in a 10% increase in the effective overall rate of opening of the guide vanes 12. Thus, FIG. 2 illustrates that the guide vane response factor (proportional band setting) is a multiplier type factor for adjusting the width of each step of a step function without changing the other features of the step function. In effect, by proper selection of the guide vane response factor, operation of the guide vanes 12 may be easily, effectively, and efficiently tailored to meet specific job requirements of a particular job application for the refrigeration system 1. For example, as shown in FIG. 2, the effective overall rate of opening of the guide vanes 12 may be a relatively rapidly or a relatively slowly increasing step function of the deviation of the evaporator 5 leaving heat transfer fluid temperature from the selected set point temperature depending on the selected setting of the guide vane response factor.

Further, it should be noted that, as shown in FIG. 2, the width of every step of each step function is approximately equal to the width of every other step of the step function and the height of every step of each step function is approximately equal to the height of every other step of the step function, with the width of every step of each step function being directly proportional to the selected guide vane response factor. Of course, in an actual control system 3 the heights and widths of every step of a particular step function may be chosen to fit particular operating requirements for the refrigeration system 1. However, it should be noted that according to the present invention, the temperature range (proportional band) over which the step function varies from 0% to 100% of effective overall guide vane operating speed, may be compressed or expanded solely by selecting the guide vane response factor which is inputted to the processor board 17 as a setting of the deadband and proportional band switches 19.

Of course, the foregoing description is directed to a particular embodiment of the present invention and various modifications and other embodiments of the present invention will be readily apparent to one of ordinary skill in the art to which the present invention pertains. Therefore, while the present invention has been described in conjunction with a particular embodiment, it is to be understood that various modifications and other embodiments of the present invention may be made without departing from the scope of the invention as described herein and as claimed in the appended claims.

What is claimed is:

1. A method of operating a refrigeration system having a microcomputer system for controlling the capacity of the refrigeration system, which comprises the steps of:

generating a first signal indicative of a selected capacity control response factor;

generating a second signal indicative of a selected set point temperature for a heat transfer fluid cooled by operation of the refrigeration system;

sensing the temperature of the heat transfer fluid cooled by operation of the refrigeration system and generating a third signal indicative of this sensed temperature;

generating a fourth signal indicative of an upper limit of a selected temperature deadband relative to the selected set point temperature;

processing the first, second, third, and fourth signals to determine the relative temperature difference between the sensed temperature and the selected set point temperature and, when the sensed temperature is determined to be greater than the selected set point temperature by an amount which exceeds the upper limit of the selected temperature deadband, to generate a control signal which is a step function of the determined relative temperature difference between the sensed temperature and the selected set point temperature, with the width of each step being directly proportional to the selected capacity control response factor; and adjusting the capacity of the refrigeration system in response to the generated control signal.

2. A method of operating a refrigeration system as recited in claim 1 wherein the step of processing comprises:

processing the first, second, third, and fourth signals to determine the relative temperature difference between the sensed temperature and the selected set point temperature and, when the sensed temperature is determined to be greater than the selected set point temperature by an amount which exceeds the upper limit of the selected temperature deadband, to generate a control signal which is a step function of the determined relative temperature difference between the sensed temperature and the selected set point temperature, with the width of each step being approximately equal to the width of every other step, and with the width of each step being directly proportional to the selected capacity control response factor.

3. A method of operating a vapor compression refrigeration system as recited in claim 1 wherein the step of processing comprises:

processing the first, second, third and fourth signals to determine the relative temperature difference between the sensed temperature and the selected set point temperature and, when the sensed temperature is determined to be greater than the selected set point temperature by an amount which exceeds the upper limit of the selected temperature deadband, to generate a control signal which is a step function of the difference between the sensed temperature and the selected set point temperature, with the height of each step being approximately equal to the height of every other step, and with the width of each step being directly proportional to the selected capacity control response factor.

4. A method of operating a refrigeration system as recited in claim 1 wherein the refrigeration system includes guide vanes for controlling refrigerant flow from an evaporator to a compressor of the refrigeration system and wherein the step of adjusting comprises:

opening the guide vanes at an effective overall rate determined by the generated control signal.

5. A control system for a refrigeration system having a microcomputer system for controlling the capacity of the refrigeration system, said control system comprising:

means for generating a first signal indicative of a selected capacity control response factor;

means for generating a second signal indicative of a selected set point temperature for a heat transfer fluid cooled by operation of the refrigeration system;

means for sensing the temperature of the heat transfer fluid cooled by operation of the refrigeration system and for generating a third signal indicative of this sensed temperature;

means for generating a fourth signal indicative of an upper limit of a selected temperature deadband relative to the selected set point temperature;

means for processing the first, second, third, and fourth signals to determine the relative temperature difference between the sensed temperature and the selected set point temperature and, when the sensed temperature is determined to be greater than the selected set point temperature by an amount which exceeds the upper limit of the selected temperature deadband, to generate a control signal which is a step function of the determined relative temperature difference between the sensed temperature and the selected set point temperature, with the width of each step being directly proportional to the selected capacity control response factor; and means for adjusting the capacity of the refrigeration system in response to the generated control signal.

6. A control system for a refrigeration system as recited in claim 5 wherein the means for processing comprises:

means for processing the first, second, third and fourth signals to determine the relative temperature difference between the sensed temperature and the selected set point temperature and, when the sensed temperature is determined to be greater than the selected set point temperature by an amount which exceeds the upper limit of the selected temperature deadband, to generate a control signal which is a step function of the determined relative temperature difference between the sensed temperature and the selected set point temperature, with the width of each step being approximately equal to the width of every other step, and with the width of each step being directly proportional to the selected capacity control response factor.

7. A control system for a refrigeration system as recited in claim 5 wherein the means for processing comprises:

means for processing the first, second, third and fourth signals to determine the relative temperature difference between the sensed temperature and the selected set point temperature and, when the sensed temperature is determined to be greater than the selected set point temperature by an amount which exceeds the upper limit of the selected temperature deadband, to generate a control signal which is a step function of the determined relative temperature difference between the sensed temperature and the selected set point temperature, with the height of each step being approximately equal to the height of every other step, and with the width of each step being directly proportional to the selected capacity control response factor.

8. A control system for a refrigeration system as recited in claim 5 wherein the refrigeration system includes guide vanes for controlling refrigerant flow from an evaporator to a compressor of the refrigeration system and wherein the means for adjusting comprises:

a guide vane actuator for opening the guide vanes at an effective overall rate determined by the control signal generated by the means for processing.

* * * * *